(12) United States Patent
Negm

(10) Patent No.: US 10,063,483 B2
(45) Date of Patent: Aug. 28, 2018

(54) ENHANCED LOAD BALANCING IN A MOBILE COMMUNICATION NETWORK

(71) Applicant: Deutsche Telekom AG, Bonn (DE)

(72) Inventor: Mohamed Negm, Bonn (DE)

(73) Assignee: DEUTSCHE TELEKOM AG, Bonn (DE)

(*) Notice: Subject to any disclaimer, the term of this patent is extended or adjusted under 35 U.S.C. 154(b) by 45 days.

(21) Appl. No.: 15/416,030

(22) Filed: Jan. 26, 2017

(65) Prior Publication Data

US 2017/0222932 A1 Aug. 3, 2017

(30) Foreign Application Priority Data

Jan. 29, 2016 (EP) ..................................... 16153267

(51) Int. Cl.
| | | |
|---|---|---|
| *H04L 12/26* | (2006.01) | |
| *H04L 12/803* | (2013.01) | |
| *H04W 8/26* | (2009.01) | |
| *H04W 8/02* | (2009.01) | |
| *H04W 88/16* | (2009.01) | |

(52) U.S. Cl.
CPC .............. *H04L 47/125* (2013.01); *H04W 8/02* (2013.01); *H04W 8/26* (2013.01); *H04W 88/16* (2013.01)

(58) Field of Classification Search
CPC ..... H04L 47/25; H04L 47/12; H04L 43/0858; H04L 43/0894; H04L 69/14; H04W 8/02; H04W 8/26; H04W 8/08; H04W 88/16; H04W 76/28; H04W 76/048; H04W 52/02

See application file for complete search history.

(56) References Cited

U.S. PATENT DOCUMENTS

| | | | |
|---|---|---|---|
| 2014/0169286 A1 | 6/2014 | Xu et al. | |
| 2014/0269268 A1* | 9/2014 | Rao ........................ | H04L 47/125 370/229 |
| 2015/0256349 A1* | 9/2015 | Kim .................... | H04L 12/1407 370/259 |
| 2016/0127889 A1* | 5/2016 | Cui ........................ | H04W 36/08 370/328 |
| 2016/0127945 A1* | 5/2016 | Cui .................... | H04W 28/0247 370/329 |
| 2016/0366574 A1* | 12/2016 | Dahan ..................... | H04W 4/90 |
| 2017/0374542 A1* | 12/2017 | Ryu ........................ | H04W 8/08 |

FOREIGN PATENT DOCUMENTS

| | | |
|---|---|---|
| EP | 2800421 A1 | 11/2014 |
| WO | 2015096051 A1 | 7/2015 |

* cited by examiner

*Primary Examiner* — Afsar M Qureshi
(74) *Attorney, Agent, or Firm* — Leydig, Voit & Mayer, Ltd.

(57) ABSTRACT

A method for enhanced load balancing in a mobile communication network includes indicating, by a home subscriber server, allocation type information and allocation mode information to a mobility management entity. A user equipment is connected or requests to be connected to the mobile communication network using an access point name identifier and a packet data network. The mobility management entity and the home subscriber server are involved in providing communication services of the mobile communication network to the user equipment and/or connecting the user equipment to the mobile communication network. A packet data network gateway is to be selected for providing the communications services of the mobile communication network.

11 Claims, 2 Drawing Sheets

ENHANCED LOAD BALANCING IN A MOBILE COMMUNICATION NETWORK

CROSS-REFERENCE TO RELATED APPLICATIONS

Priority is claimed to European Patent Application No. EP 16153267.6, filed on Jan. 29, 2016, the entire disclosure of which is hereby incorporated by reference herein.

FIELD

The present invention relates a method for enhanced load balancing in a mobile communication network, wherein a user equipment is connected or requests to be connected to the mobile communication network using an access point name identifier and a packet data network, wherein a mobility management entity and a home subscriber server are involved to provide communication services of the mobile communication network to the user equipment and/or to connect the user equipment to the mobile communication network.

Furthermore, the present invention relates to a home subscriber server and a mobility management entity for enhanced load balancing in a mobile communication network, wherein a user equipment is connected or requests to be connected to the mobile communication network using an access point name identifier and a packet data network, wherein a mobility management entity and a home subscriber server are involved to provide communication services of the mobile communication network to the user equipment and/or to connect the user equipment to the mobile communication network.

Furthermore, the present invention relates to a mobile communication network for enhanced load balancing in a mobile communication network, wherein a user equipment is connected or requests to be connected to the mobile communication network using an access point name identifier and a packet data network, wherein a mobility management entity and a home subscriber server are involved to provide communication services of the mobile communication network to the user equipment and/or to connect the user equipment to the mobile communication network.

Furthermore, the present invention relates to a program and to a computer program product for enhanced load balancing in a mobile communication network.

BACKGROUND

Machine-To-Machine (M2M) services, and requirements from M2M network providers are continuously increasing nowadays. Due to this increase, the operators (or network operators of mobile communication networks) are using dedicated network elements in the core network of the mobile communication networks such that the dedicated network elements or network nodes are used exclusively for M2M traffic or M2M related traffic to provide the capacity and resources needed for, e.g., millions of subscribers and devices, especially involving machine-to-machine functionalities, all over the world.

Machine-to-machine roaming partnerships and contracts are increasing between operators all over the globe to provide their business customers with the best and widest coverage.

In a typical mobile communication network, as a part of the attachment procedure of the user equipment, the respective (or responsible) base station entity of a considered user equipment, i.e. typically an eNodeB base station entity, will query a server entity (such as an Internal Domain Name System (iDNS) Server), typically using the tracking area information, in order to obtain an address of a network node providing the mobility management entity functionalities for the considered base station entity and user equipment, i.e. being the responsible mobility management entity node for the considered user equipment.

The selected mobility management entity afterwards selects a network node responsible for providing the functionalities of a packet data network gateway (PDN-GW or PGW). Typically, at the packet data network gateway, a packet data network connectivity (or access point name (APN)) is located, namely the packet data network connectivity requested (and/or subscribed) by the user equipment.

This selection (of the network node responsible for providing the functionalities of a packet data network gateway) can either be based on an information provided—by the user equipment, upon attaching to the mobile communication network—to the mobility management entity (MME). Alternatively, the address of the packet data network gateway to be used (for the access point name (or packet data network connectivity) by the user equipment) could also be provided directly by the home subscriber server, or (especially during a bearer setup procedure) by the used network node providing the functionalities of a domain name system (DNS), or the address of the packet data network gateway could also be configured on the responsible mobility management entity. Hence, the selection of the packet data network gateway is performed by the corresponding mobility management entity (network node) or by the serving gateway support node (SGSN) at initial attach of the user equipment to the mobile communication network, or during PDN connection establishment to the packet data network.

In case that—within a given mobile communication network or core network architecture thereof—at least part of the access point names are both used for machine-to-machine services (or to services that are related or similar to machine-to-machine services), and for non-machine-to-machine services (i.e. typically consumer services provided to (mostly) human operated user equipments, such as, e.g., interne multimedia subsystem services (IMS services) or the like), it can be challenging to provide corresponding network capacities such that quality-of-service requirements as well as mobility requirements can be met in each situation, especially in case that a considered user equipment (requiring either a machine-to-machine type service, or a non-machine-to-machine type service) is roaming in a visited communication network.

SUMMARY

In an exemplary embodiment, the present invention provides a method for enhanced load balancing in a mobile communication network. A user equipment is connected or requests to be connected to the mobile communication network using an access point name identifier and a packet data network. A mobility management entity and a home subscriber server are involved in providing communication services of the mobile communication network to the user equipment and/or connecting the user equipment to the mobile communication network. A packet data network gateway is to be selected for providing the communications services of the mobile communication network. The method includes indicating, by the home subscriber server, allocation type information and allocation mode information to the mobility management entity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
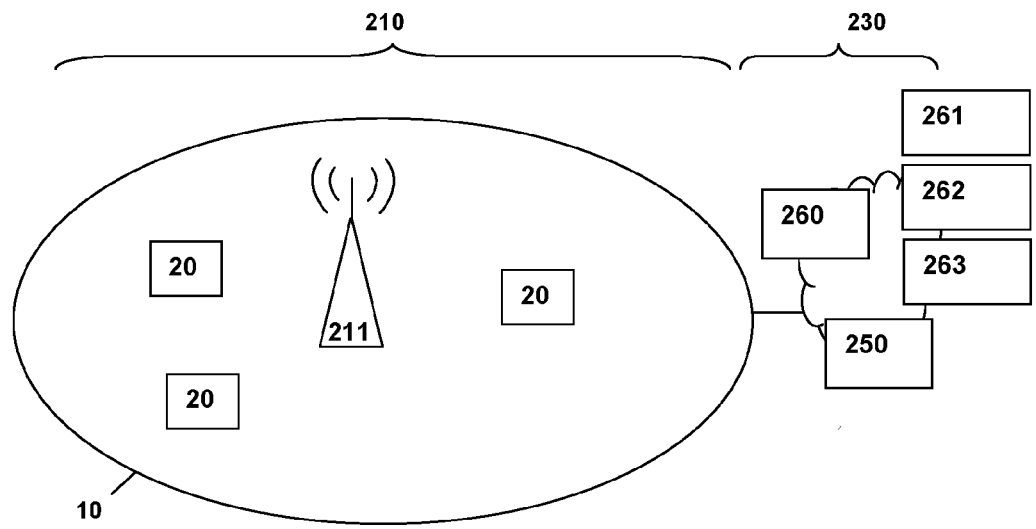
FIG. 1 schematically illustrates a mobile telecommunications network for enhanced load balancing in a mobile communication network, wherein the mobile communication network serves as an example of a telecommunications network according to the present invention.

Exemplary embodiments of the present invention to provide a method for enhanced load balancing in a mobile communication network, especially regarding the selection of a packet data network gateway node (or a network node providing the services or functionality of a packet data network gateway) and especially in case that at least part of the access point names are both used for machine-to-machine services (or to services that are related or similar to machine-to-machine services), and for non-machine-to-machine services, such as consumer services provided to (mostly) human operated user equipments, such as, e.g., interne multimedia subsystem services (IMS services) or the like.

In an exemplary embodiment, the present invention provides a method for enhanced load balancing in a mobile communication network, wherein a user equipment is connected or requests to be connected to the mobile communication network using an access point name identifier and a packet data network, wherein a mobility management entity and a home subscriber server are involved to provide communication services of the mobile communication network to the user equipment and/or to connect the user equipment to the mobile communication network, wherein a packet data network gateway needs to be selected for providing the communications services of the mobile communication network, wherein the home subscriber server indicates an allocation type information to the mobility management entity, wherein, the method comprises the step of, in addition to indicating an allocation type information to the mobility management entity, the home subscriber server indicates an allocation mode information to the mobility management entity.

It is thereby advantageously possible according to the present invention that an enhanced load balancing is possible within the mobile communication network. This is due to the fact that, via the home subscriber server indicating an allocation mode information to the mobility management entity, it is advantageously possible according to the present invention—especially in case that the allocation type information indicates that static allocation of the packet data network gateway (or plurality of packet data network gateway) is used—to provide a list involving or comprising a plurality of potential packet data network gateway nodes to the mobility management entity such that the packet data network gateway node that is eventually allocated to serve the mobility management entity (and hence the packet data network connection requested by the user equipment) can be determined or selected by the mobility management entity, especially from the perspective of an enhanced load balancing, among the plurality of different packet data network gateways (or packet data network gateway nodes) provided by the list.

Alternatively or additionally to indicating an allocation mode information to the mobility management entity, it is also possible and preferred according to the present invention that the home subscriber server indicates, to the mobility management entity,—especially as part of an allocation type information (e.g. as a third possibility besides the "allocation type=static" and the "allocation type=dynamic" (meaning that the packet data network gateway is provisioned dynamically through the mobility management entity resolving the access point name with a DNS node))—a list involving or comprising a plurality of potential packet data network gateway nodes such that the packet data network gateway node that is eventually allocated to serve the mobility management entity (and hence the packet data network connection requested by the user equipment) can be determined or selected by the mobility management entity, especially from the perspective of an enhanced load balancing, among the plurality of different packet data network gateways (or packet data network gateway nodes) provided by that list. Likewise in such an embodiment, the user equipment is connected or requests to be connected to the mobile communication network using an access point name identifier and a packet data network, a home subscriber server and a mobility management entity being involved to provide communication services of the mobile communication network to the user equipment and/or to connect the user equipment to the mobile communication network, and a packet data network gateway needs to be selected for providing the communications services of the mobile communication network.

The scenario mentioned (of the home subscriber server being able to indicate a list involving or comprising a plurality of potential packet data network gateway nodes to the mobility management entity such that the packet data network gateway node that is eventually allocated to serve the mobility management entity (and the user equipment) is selectable, by the mobility management entity, among the plurality of different packet data network gateways provided by this list) is especially relevant in case that a user equipment—being associated to a home communication network—is roaming in a visited communication network. Hence, it is preferred according to the present invention that the (considered) mobile communication network is acting as a (or the) home communication network for the considered user equipment (i.e. the user equipment being a roaming user equipment) that is roaming in a visited communication network, wherein the mobility management entity (of the visited communication network) involved for providing the communication services of the mobile communication network (i.e. the home communication network) to the roaming user equipment and/or to connect the roaming user equipment to the home communication network corresponds to a mobility management entity of the visited communication network.

Via the home subscriber server (of the home communication network) indicating an allocation mode information to the mobility management entity (of the visited communication network), it is, hence, advantageously possible according to the present invention to provide the mentioned list involving or comprising a plurality of potential packet data network gateway nodes to the mobility management entity (of the visited communication network).

According to the present invention it is preferred that the allocation type information transmitted by the home subscriber server indicates that the packet data network gateway is to be statically allocated.

Via indicating an allocation type information to be of a static allocation (especially meaning that the packet data network gateway is provisioned by the home subscriber server and that it is statically allocated), it is advantageously possible, according to the present invention, to provide the allocation mode information in addition to the allocation type information.

According to the present invention it is preferred that the allocation mode information
  either indicates that the allocation mode of the packet data network gateway to be used corresponds to indicating a plurality of identifiers of packet data network gateways in order for the respective mobility management entity to be able to provide load balancing among the plurality of packet data network gateways specified,
  or indicates that the allocation mode of the packet data network gateway to be used corresponds to a single identifier of a packet data network gateway.

By either indicating, via the allocation mode information, that the mobility management entity is able to choose among a plurality of packet data network gateways, or indicating, via the allocation mode information, that a specific (or static) packet data network gateway is to be used, it is advantageously possible—dependent on the content of the allocation mode information—to provide the possibility of either an enhanced load balancing (for the respective mobility management entity) among a plurality of packet data network gateways, or a static allocation of a packet data network gateway.

In case that the allocation mode information indicates that the allocation mode of the packet data network gateway to be used corresponds to indicating a plurality of identifiers of packet data network gateways, it is furthermore preferred that the allocation mode information additionally comprises an additional information indicating whether the plurality of identifiers of packet data network gateways relate to load-balancing gateways or active-standby gateways.

Thereby, it is advantageously possible to declare—e.g., by using flags or a flag information as the additional information (as part of the allocation mode information)—whether the plurality of identifiers of packet data network gateways relate to load-balancing gateways or active-standby gateways.

According to the present invention it is furthermore preferred that the allocation type information and/or the allocation mode information is provided to the involved mobility management entity upon a request of the mobility management entity towards the home subscriber server.

Thereby, it is advantageously possible to provide a flexible and backwards compatible exchange of allocation type information and/or allocation mode information. E.g., it is advantageously possible that the respective mobility management entity indicates (via a request) to the home subscriber server that it is able to handle an allocation mode information (besides an allocation type information).

Furthermore, the present invention relates to a home subscriber server for enhanced load balancing in a mobile communication network, wherein a user equipment is connected or requests to be connected to the mobile communication network using an access point name identifier and a packet data network, wherein the home subscriber server is configured such that a mobility management entity is involved to provide communication services of the mobile communication network to the user equipment and/or to connect the user equipment to the mobile communication network, wherein the home subscriber server is furthermore configured such that a packet data network gateway needs to be selected for providing the communications services of the mobile communication network, wherein furthermore the home subscriber server is configured such that the home subscriber server indicates an allocation type information to the mobility management entity, wherein, the home subscriber server is furthermore configured such that, in addition to indicating an allocation type information to the mobility management entity, the home subscriber server indicates an allocation mode information to the mobility management entity.

Thereby, it is advantageously possible according to the present invention that an enhanced load balancing is possible within the mobile communication network. Via the home subscriber server indicating an allocation mode information to the mobility management entity, it is advantageously possible to provide a list involving or comprising a plurality of potential packet data network gateway nodes to the mobility management entity. Alternatively or additionally to indicating an allocation mode information to the mobility management entity, it is also possible and preferred according to the present invention that the home subscriber server is configured such that it indicates, to the mobility management entity—especially as part of an allocation type information—a list involving or comprising a plurality of potential packet data network gateway nodes such that the packet data network gateway node that is eventually allocated to serve the mobility management entity (and hence the packet data network connection requested by the user equipment) can be determined or selected by the mobility management entity, especially from the perspective of an enhanced load balancing, among the plurality of different packet data network gateways (or packet data network gateway nodes) provided by that list. Likewise in such an embodiment, the user equipment is connected or requests to be connected to the mobile communication network using an access point name identifier and a packet data network, the home subscriber server and a mobility management entity being involved to provide communication services of the mobile communication network to the user equipment and/ or to connect the user equipment to the mobile communication network, and a packet data network gateway needs to be selected for providing the communications services of the mobile communication network.

Also in case of the home subscriber server, the mentioned scenario is especially relevant in case that the user equipment is roaming in a visited communication network. Hence, it is preferred according to the present invention that the home subscriber server is part of a mobile communication network that is acting as a home communication network for a roaming user equipment that is roaming in a visited communication network, wherein the mobility management entity involved for providing the communication services of the mobile communication network (i.e. the home communication network) to the roaming user equipment and/or to connect the roaming user equipment to the home communication network corresponds to a mobility management entity of the visited communication network.

Furthermore, the present invention relates to a mobile communication network for enhanced load balancing within the mobile communication network, wherein a user equipment is connected or requests to be connected to the mobile communication network using an access point name identifier and a packet data network, wherein the mobile communication network is configured such that a mobility management entity and a home subscriber server is involved to provide communication services of the mobile communication network to the user equipment and/or to connect the user equipment to the mobile communication network, wherein the mobile communication network is furthermore configured such that a packet data network gateway needs to be selected for providing the communications services of the mobile communication network, wherein furthermore the mobile communication network is configured such that the home subscriber server indicates an allocation type information to the mobility management entity, wherein, the mobile communication network is furthermore configured such that, in addition to indicating an allocation type information to the mobility management entity, the home subscriber server indicates an allocation mode information to the mobility management entity.

Thereby, it is advantageously possible according to the present invention that an enhanced load balancing is possible within the mobile communication network. Via the home subscriber server (of the mobile communication network) indicating an allocation mode information to the mobility management entity, it is advantageously possible to provide a list involving or comprising a plurality of potential packet data network gateway nodes to the mobility management entity. Alternatively or additionally to indicating an allocation mode information to the mobility management entity, it is also possible and preferred according to the present invention that the mobile communication network is configured such that it (or the respective home subscriber server) indicates, to the mobility management entity—especially as part of an allocation type information—a list involving or comprising a plurality of potential packet data network gateway nodes such that the packet data network gateway node that is eventually allocated to serve the mobility management entity (and hence the packet data network connection requested by the user equipment) can be determined or selected by the mobility management entity, especially from the perspective of an enhanced load balancing, among the plurality of different packet data network gateways (or packet data network gateway nodes) provided by that list. Likewise in such an embodiment, the user equipment is connected or requests to be connected to the mobile communication network using an access point name identifier and a packet data network, the home subscriber server and a mobility management entity being involved to provide communication services of the mobile communication network to the user equipment and/or to connect the user equipment to the mobile communication network, and a packet data network gateway needs to be selected for providing the communication services of the mobile communication network.

Additionally, the present invention relates to a mobile communication network acting as a home communication network for a roaming user equipment that is roaming in a visited communication network, wherein the mobility management entity involved for providing the communication services of the mobile communication network to the roaming user equipment and/or to connect the roaming user equipment to the mobile communication network (i.e. the home communication network) corresponds to a mobility management entity of the visited communication network.

Additionally, the present invention relates to a mobile communication network acting as a visited communication network for a roaming user equipment that is roaming in the visited communication network and having a home communication network (connected to the mobile communication network), wherein the mobility management entity involved for providing the communication services of the mobile communication network (being the home communication network) to the roaming user equipment and/or to connect the roaming user equipment to the home communication network corresponds to a mobility management entity of the visited communication network.

Additionally, the present invention relates to a program comprising a computer readable program code which, when executed on a computer or on a network node of a telecommunications network, especially providing the functionalities of a mobility management entity and/or especially providing the functionalities of a home subscriber server, or in part on a first network node, especially providing the functionalities of a mobility management entity, and in part on a second network node, especially providing the functionalities of a home subscriber server, causes the computer or the network node or the network nodes of the telecommunications network to perform the method according to the present invention.

Still additionally, the present invention relates to a computer program product for enhanced load balancing in a mobile communication network, the computer program product comprising a computer program stored on a storage medium, the computer program comprising program code which, when executed on a computer or on a network node of a telecommunications network, especially providing the functionalities of a mobility management entity and/or especially providing the functionalities of a home subscriber server, or in part on a first network node, especially providing the functionalities of a mobility management entity, and in part on a second network node, especially providing the functionalities of a home subscriber server, causes the computer or the network node or the network nodes of the telecommunications network to perform the method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 200 or mobile communication network 200 for enhanced load balancing according to the present invention is schematically illustrated. The mobile communication network 200 is implemented comprising a radio access network 210 and a core network 230. The mobile communication network 200 is configured to provide communication services to a plurality of user equipments 20. According to the representation of FIG. 1, the plurality of user equipments 20 are located within a coverage area 10 of a base station entity 211, especially an eNodeB, of the radio access network 210 of the mobile communication network 200. The mobile communication network 200 is configured to provide communication services—for example Internet services or Internet multimedia subsystem (IMS) services—to one of the user equipments 20 or to all of the plurality of user equipments 20 via the base station entity 211 (i.e. the eNodeB) of the radio access network 210. The core network 230 of the mobile communication network 200 comprises a home subscriber server (HSS) 250 and a mobility management entity (MME) 260. This means that the core network 230 of the mobile communication network 200 comprises a network node providing a home subscriber server functionality 250 (typically, this is performed by one network node but according to a variant of the present invention (not depicted in FIG. 1) also a plurality of network nodes could be provided such as to collectively providing the functionality of a home subscriber server), and a network node or at least one network node providing (collectively or each one) the functionality (functionalities) of one (or a plurality of) mobility management entity 260 (or a plurality of mobility management entities 260). The at least one mobility management entity 260 is configured to receive downlink data packets from an upstream source and to transmit uplink data packets towards an upstream destination, wherein the upstream source and upstream destination especially comprise a plurality of packet data network gateways. In FIG. 1, a first packet data network gateway or packet data network gateway node is designated by reference sign 261, a second packet data network gateway or packet data network gateway node is designated by reference sign 262, and a third packet data network gateway or packet data network gateway node is designated by reference sign 263. In the exemplary embodiment schematically shown in FIG. 1, the first, second and third packet data network gateways 261, 262, 263 are connected to the core network 230; however, at least part of the plurality of packet data network gateways 261, 262, 263 can also be located externally to the core network 230. FIG. 1 represents a situation where the user equipment 20 is served by its home communication network, i.e. the mobile communication network 200 corresponds to the home communication network of the user equipment 20 or user equipments 20.

Figure 3:
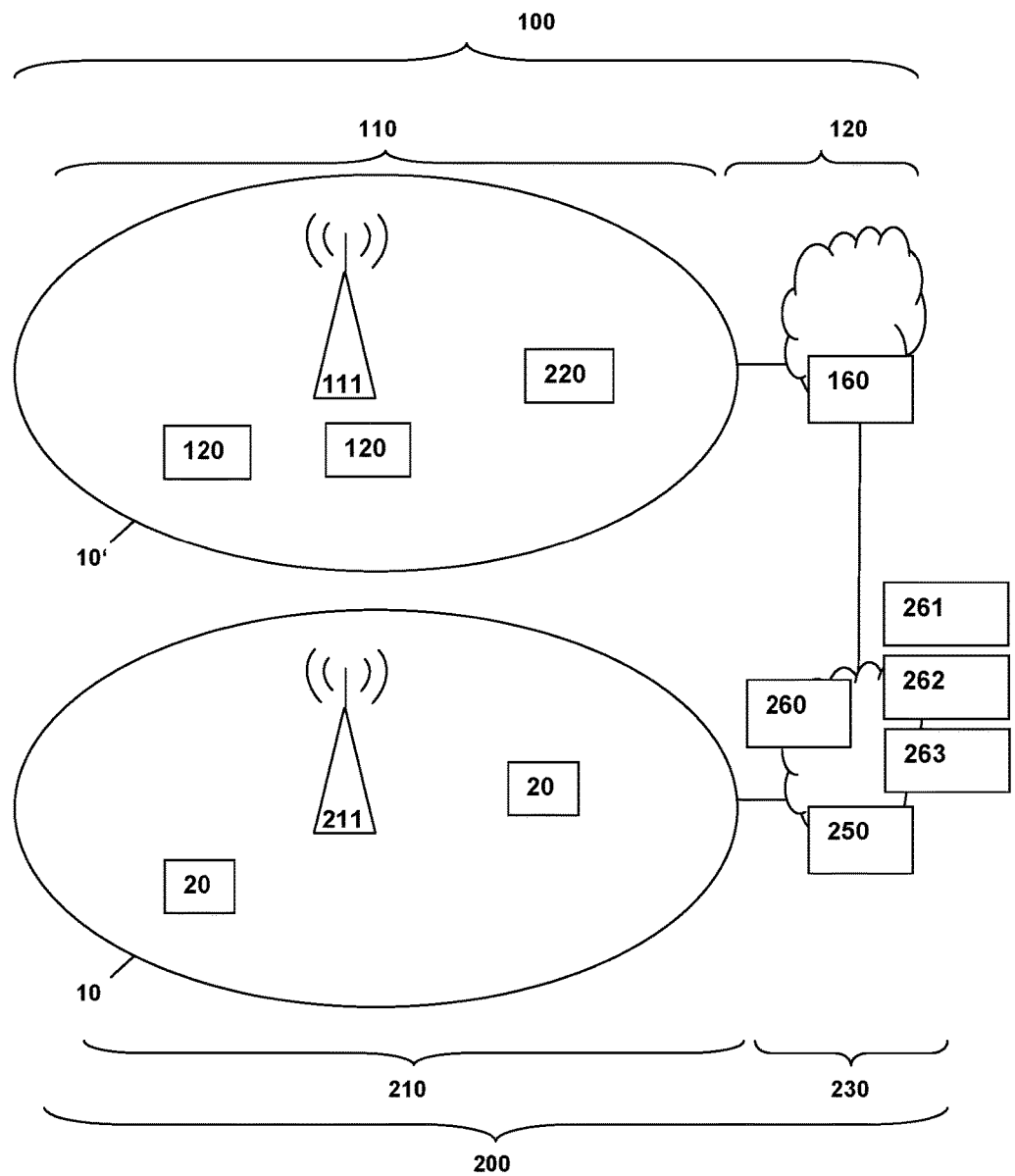
FIG. 3 schematically illustrates the situation of a first mobile communication network and a second mobile communication network, wherein one of the first and second mobile communication networks acts as home communication network for a user equipment and the other mobile communication network acts as visited communication network for the user equipment, wherein a network node serving as home subscriber server of the mobile communication network serving as home communication network interacts with a network node serving as mobility management entity of the mobile communication network serving as visited communication network according to the present invention.

In FIG. 3, the case of a roaming user equipment is schematically illustrated, i.e. the situation of a first mobile communication network 100 and a second mobile communication network 200, wherein one of the first and second mobile communication networks 100, 200 acts as home communication network for a user equipment 220 (roaming in the other mobile communication network) and the other mobile communication network acts as visited communication network for the user equipment 220. A network node serving as home subscriber server 250 of the (second) mobile communication network 200 (serving as home communication network to a user equipment roaming in the (first) mobile communication network 100) interacts with a network node serving as mobility management entity 160 of the (first) mobile communication network 100 (serving as visited communication network to this considered user equipment). In the following, the first mobile communication network 100 (or mobile communication network serving as visited communication network) is also called visited communication network, and the second mobile communication network 200 (or mobile communication network serving as home communication network to the considered (roaming) user equipment) is also called home communication network. Like the mobile communication network/home communication network described in connection with FIG. 1, also the mobile communication networks 100, 200 of FIG. 3 are implemented comprising, respectively a radio access network and a core network. Especially, the first mobile communication network 100 (or visited communication network) is implemented comprising a (first) radio access network 110 and a (first) core network 120 (and the second mobile communication network 200 (or home communication network) is implemented comprising a (second) radio access network 210 and a (second) core network 230. Also the (first) mobile communication network 100/visited communication network is configured to provide communication services to a plurality of user equipments (designated by reference signs 120, 220), wherein the user equipment designated by reference sign 220 is meant to correspond to a user equipment being associated to the second mobile communication network 200 as home communication network, i.e. user equipment 220 is a roaming user equipment, roaming in the first mobile communication network 100 (as visited communication network), and wherein the user equipment designated by reference sign 120 is meant to correspond to a user equipment being associated to the first mobile communication network 100 as its home communication network, i.e. user equipment 120 is a non-roaming user equipment with respect to the first mobile communication network 100. According to the representation of FIG. 3, the plurality of user equipments 120, 220 are located within a coverage area 10' of a base station entity 111, especially an eNodeB, of the radio access network 110 of the first mobile communication network 100. The second mobile communication network 200 (or home communication network) is configured to provide—via or using the first mobile communication network 100 as visited communication network (to the roaming user equipment 220)—communication services, for example Internet services or Internet multimedia subsystem (IMS) services, to the (roaming) user equipment 220 or to all of the plurality of user equipments 20 accessing the (second) mobile communication network 200 via the (second) base station entity 211 (i.e. the eNodeB) of the (second) radio access network 210. The (second) core network 230 of mobile communication network 200 comprises a home subscriber server (HSS) 250 (or one or a plurality of network nodes providing this functionality) and both the (first) mobile communication network 100/visited communication network and the (second) mobile communication network 200/home communication network comprise a mobility management entity (or at least one mobility management entity). The relevant (or responsible) mobility management entity for the roaming user equipment 220 is the mobility management entity node designated by reference sign 160 being located in the (first) mobile communication network 100/visited communication network, as the considered roaming user equipment 220 is connected to the (first) access network 110 of the visited communication network (while still being (also) connected to its home communication network).

In order to provide the (requested) communication services of the mobile communication network 200 (home network) to the considered roaming user equipment 220, the mobility management entity node 160 is configured to receive downlink data packets from an upstream source and to transmit uplink data packets towards an upstream destination, wherein the upstream source and upstream destination especially comprise a plurality of packet data network gateways. Analogous to FIG. 1, FIG. 3 shows, the first, second and third packet data network gateways 261, 262, 263 which are connected to the (second) core network 230 (of the home communication network 200 of the considered user equipment 220); however, at least part of the plurality of packet data network gateways 261, 262, 263 can also be located externally to the (second) core network 230.

Figure 2:
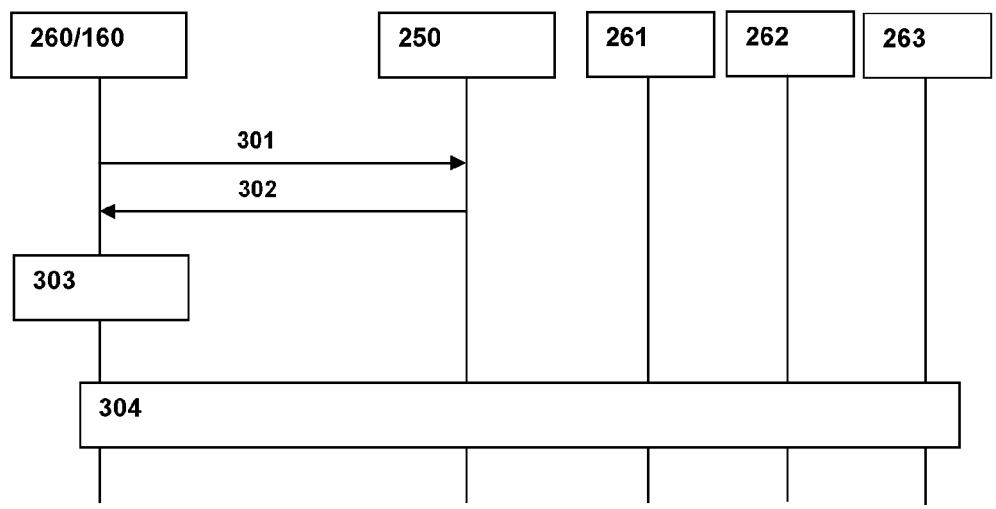
FIG. 2 schematically illustrates a communication diagram according to the present invention, wherein the home subscriber server node of the mobile communication network transmits a list of packet data network gateway nodes to the mobility management entity such that enhanced load balancing is advantageously possible within the mobile communication network, especially related to machine-to-machine type communication traffic.

According to the present invention, the method for enhanced load balancing comprises an exchange of signaling information between the respective mobility management entity, and the respective home subscriber server (of the considered user equipment). In case of the non-roaming user equipment 20 (within the (second) mobile communication network 200 (of FIG. 1 or FIG. 3), this exchange concerns the mobility management entity 260 of the (second) mobile communication network 200 and the home subscriber server 250 of the (second) mobile communication network 200. In case of the roaming user equipment 220, roaming within the (first) mobile communication network 100 (of FIG. 3), this exchange concerns the mobility management entity 160 of the (first) mobile communication network 100 (i.e. the visited communication network 100 regarding this user equipment) and the home subscriber server 250 of the (second) mobile communication network 200 (i.e. the home communication network 200 regarding this user equipment). This is shown in FIG. 2, where a representation of a communication diagram according to the present invention is schematically shown, wherein the home subscriber server node 250 of the (home) mobile communication network 200 transmits a list of packet data network gateway nodes to the respective mobility management entity 160, 260 such that an enhanced load balancing is advantageously possible within the mobile communication network 200, especially related to machine-to-machine type communication traffic. The exchange of signaling information between the respective mobility management entity, and the respective home subscriber server, and the following load balancing between gateway nodes especially comprises first, second and third processing steps as is described in the following; however a different transmission of signaling information is possible and preferred according to the present invention as long as the home subscriber server 250 indicates at least one out of an allocation type information and an allocation mode information to the mobility management entity 160, 260, or indicates at least a plurality of identifiers of packet data network gateways 261, 262, 263 in order for the respective mobility management entity 160, 260 to be able to provide load balancing among the plurality of packet data network gateways 261, 262, 263 specified.

In the exemplary embodiment represented in FIG. 2, in a first processing step 301, the mobility management entity 160, 260 typically transmits a request message to the home subscriber server 250, the request message especially being of the form of an "Update Location Request" message.

In a second processing step 302, the home subscriber server 250 transmits a response message to the mobility management entity 160, 260, the response message especially being of the form of an "Insert Subscriber Data" message. The allocation type information and/or the allocation mode information is especially transmitted via the response message (being especially of the form of an "Insert Subscriber Data" message), i.e. the response message typically comprises an indication that a plurality of packet data network gateways are indicated as possible upstream source and/or destination node for data packets. Especially, the transmitted allocation type information comprises the content of "PDN-GW-Allocation-Type=Static" and the allocation mode information comprises the content of "PDN-GW-Allocation-Mode=List". Furthermore, the plurality of identifiers of packet data network gateways 261, 262, 263 is especially transmitted, by the home subscriber server 250 to the respective mobility management entity 160, 260, by transmitting
- a "MIP-Home-Agent-Address-List" (especially followed by the addresses of the packet data network gateway nodes 261, 262, 263), and/or
- a "MIP-Home-Agent-Hosts" (especially followed by the hostnames of the packet data network gateway nodes 261, 262, 263), and/or
- a "MIP-Home-Agent-Info" (especially followed by the information of the packet data network gateway nodes 261, 262, 263).

Via these identifiers or via this information, the identity of the respective packet data network gateway or the identities of the respective packet data network gateways is or are transmitted.

In a third processing step 303, load balancing between the packet data network gateway nodes 261, 262, 263 is performed by the respective mobility management entity 160, 260, and, in a fourth processing step 304, a normal connection according to 3GPP procedures established towards the chosen packet data network gateway node (based on the load balancing decision).

Load balancing is advantageous as one of the challenging parts of providing machine-to-machine services, is how to provide the customer (whether using a non-machine-to-machine service or an machine-to-machine service) with the highest level of mobility all over the world, while it is still ensured that the traffic is routed to the home core network (or home communication network 200). In case that the non-machine-to-machine traffic can be separated from the machine-to-machine traffic via specific and dedicated access point names (to be used for either traffic), resulting in routing the traffic to the home gateways through the DNS resolving capabilities, this requirement can be easier met. However, in case that the operator is using dedicated core network elements for machine-to-machine services, and some machine-to-machine communication services (or machine-to-machine type communication services) overlap with local consumer services access point names (i.e. access point names used for non-machine-to-machine services—such as, e.g., IMS services), i.e. both types of communication services share a common access point name, to provide a high level of mobility requires considerable efforts and costs, as the operator faces the problem to differentiate between traffic coming from normal subscribers (i.e. non-machine-to-machine traffic) and machine-to-machine traffic (typically coming from machine-to-machine customers), as routing the machine-to-machine traffic to a dedicated machine-to-machine core network will not be possible. In such a situation, the present invention provides the possibility to transmit a plurality of identifiers of packet data network gateway nodes.

To ensure load-balancing and also keep the same structure of the network, the user profile on the home subscriber server 250 must contain a list of packet data network gateways 261, 262, 263, not only one, preferably with flags to show whether it is a load-balancing gateways list or an active-standby list. The respective mobility management entity 160, 260 then will be responsible for realizing the flag and start the proper communication with the system, i.e. through the home subscriber server 250 via the request message. When the respective mobility management entity 160, 260 receives the allocation mode as "List" (i.e. the allocation mode information indicates that the allocation mode of the packet data network gateway to be used corresponds to indicating a plurality of identifiers of packet data network gateways), the mobility management entity can internally perform load-balancing (as well as the active stand-by list) between the gateways of the list of gateways, to ensure load is shared between all gateways in the list every time the same access point name is used by a user equipment or an IMSI (International Mobile Subscriber Identity).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced load balancing in a mobile communication network,
   wherein a user equipment is connected or requests to be connected to the mobile communication network using an access point name identifier and a packet data network,
   wherein a mobility management entity and a home subscriber server are involved in providing communication services of the mobile communication network to the user equipment and/or connecting the user equipment to the mobile communication network,
   wherein a packet data network gateway is to be selected for providing the communications services of the mobile communication network,
   wherein the method comprises:
   indicating, by the home subscriber server, allocation type information and allocation mode information to the mobility management entity.

2. The method according to claim 1, wherein the mobile communication network is acting as a home communication network for a roaming user equipment that is roaming in a visited communication network, wherein the mobility management entity is involved in providing the communication services of the mobile communication network to the roaming user equipment and/or connecting the roaming user equipment to the home communication network, and wherein the mobility management entity corresponds to a mobility management entity of the visited communication network.

3. The method according to claim 1, wherein the allocation type information indicates that the packet data network gateway is to be statically allocated.

4. The method according to claim 1, wherein the allocation mode information indicates that the allocation mode of the packet data network gateway to be used corresponds to:
   indicating a plurality of identifiers of packet data network gateways in order for the respective mobility management entity to be able to provide load balancing among the plurality of packet data network gateways specified; or
   a single identifier of a packet data network gateway.

5. The method according to claim 4, wherein, in case that the allocation mode information indicates that the allocation mode of the packet data network gateway to be used corresponds to indicating a plurality of identifiers of packet data network gateways, the allocation mode information additionally comprises additional information indicating whether the plurality of identifiers of packet data network gateways relate to load-balancing gateways or active-standby gateways.

6. The method according to claim 1, wherein the allocation type information and/or the allocation mode information is provided to the mobility management entity upon a request of the mobility management entity towards the home subscriber server.

7. A home subscriber server for enhanced load balancing in a mobile communication network,
   wherein a user equipment is connected or requests to be connected to the mobile communication network using an access point name identifier and a packet data network,
   wherein the home subscriber server and a mobility management entity are involved in providing communication services of the mobile communication network to the user equipment and/or connecting the user equipment to the mobile communication network, wherein the home subscriber server comprises a processor and a memory, wherein the processor is configured to execute processor-executable instructions stored in the memory to facilitate selecting a packet data network gateway for providing the communications services of the mobile communication network, wherein the selecting the packet data network gateway comprises:

indicating, by the home subscriber server, allocation type information and allocation mode information to the mobility management entity.

8. The home subscriber server according to claim 7, wherein the home subscriber server is part of a mobile communication network that is acting as a home communication network for a roaming user equipment that is roaming in a visited communication network, wherein the mobility management entity is involved in providing the communication services of the mobile communication network to the roaming user equipment and/or connecting the roaming user equipment to the home communication network, and wherein the mobility management entity corresponds to a mobility management entity of the visited communication network.

9. A mobility management entity for enhanced load balancing in a mobile communication network, wherein a user equipment is connected or requests to be connected to the mobile communication network using an access point name identifier and a packet data network, wherein the mobility management entity and a home subscriber server are involved in providing communication services of the mobile communication network to the user equipment and/or connecting the user equipment to the mobile communication network, wherein the mobility management entity comprises a processor and a memory, wherein the processor is configured to execute processor-executable instructions stored in the memory to facilitate selecting a packet data network gateway for providing the communications services of the mobile communication network, wherein the selecting the packet data network gateway comprises:

receiving, by the mobility management entity, allocation type information and allocation mode information from the home subscriber server.

10. The mobility management entity according to claim 9, wherein the mobility management entity is part of a mobile communication network that is acting as a visited communication network for a roaming user equipment of a home communication network.

11. A non-transitory computer-readable medium having processor-executable instructions stored thereon for enhanced load balancing in a mobile communication network, wherein a user equipment is connected or requests to be connected to the mobile communication network using an access point name identifier and a packet data network, wherein a mobility management entity and a home subscriber server are involved in providing communication services of the mobile communication network to the user equipment and/or connecting the user equipment to the mobile communication network, wherein the processor-executable instructions, when executed, facilitate selecting a packet data network gateway for providing the communications services of the mobile communication network, wherein the selecting the packet data network gateway comprises: indicating, by the home subscriber server, allocation type information and allocation mode information to the mobility management entity.

* * * * *